United States Patent
Fu et al.

(10) Patent No.: US 11,482,876 B2
(45) Date of Patent: Oct. 25, 2022

(54) METHOD, APPARATUS AND SYSTEM FOR CONTROLLING CHARGING OF A BATTERY MODULE

(71) Applicant: Contemporary Amperex Technology Co., Limited, Ningde (CN)

(72) Inventors: Xin Fu, Ningde (CN); Fuping Luo, Ningde (CN); Shengwei Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 205 days.

(21) Appl. No.: 17/120,453

(22) Filed: Dec. 14, 2020

(65) Prior Publication Data

US 2022/0190623 A1 Jun. 16, 2022

Related U.S. Application Data

(62) Division of application No. 15/869,318, filed on Jan. 12, 2018, now Pat. No. 10,910,860.

(30) Foreign Application Priority Data

Jan. 19, 2017 (CN) .......................... 201710040478.0

(51) Int. Cl.
*H02J 7/00* (2006.01)
*H01M 10/42* (2006.01)

(52) U.S. Cl.
CPC ....... *H02J 7/00719* (2020.01); *H01M 10/425* (2013.01); *H02J 7/007182* (2020.01); *H01M 2010/4271* (2013.01)

(58) Field of Classification Search
None
See application file for complete search history.

(56) References Cited

U.S. PATENT DOCUMENTS

| | | | |
|---|---|---|---|
| 5,703,465 A | 12/1997 | Kinoshita et al. | |
| 6,094,033 A | 7/2000 | Ding et al. | |
| 6,437,542 B1 | 8/2002 | Liaw et al. | |
| 6,459,238 B2 * | 10/2002 | Minamiura | H02J 7/007188 320/147 |
| 2010/0033138 A1 | 2/2010 | Alger et al. | |
| 2013/0082664 A1 | 4/2013 | Hiraoka et al. | |
| 2015/0295431 A1 * | 10/2015 | Honda | H02J 7/0013 320/152 |
| 2016/0039289 A1 | 2/2016 | Fink | |
| 2016/0064780 A1 | 3/2016 | Jarvis et al. | |
| 2017/0077717 A1 | 3/2017 | Lundgren et al. | |
| 2018/0205236 A1 * | 7/2018 | Fu | H01M 50/574 |
| 2018/0313900 A1 | 11/2018 | Koga et al. | |
| 2019/0044345 A1 | 2/2019 | Komiyama et al. | |
| 2019/0181652 A1 * | 6/2019 | Komiyama | H02J 7/00302 |
| 2019/0198940 A1 | 6/2019 | Komiyama et al. | |
| 2022/0190623 A1 * | 6/2022 | Fu | H02J 7/007182 |

FOREIGN PATENT DOCUMENTS

| | | |
|---|---|---|
| CN | 101404346 A | 4/2009 |
| CN | 100514710 C | 7/2009 |
| CN | 101529692 A | 9/2009 |
| CN | 102473971 A | 5/2012 |
| CN | 102893170 B | 7/2015 |
| CN | 105189183 A | 12/2015 |
| CN | 106025370 A | 10/2016 |
| EP | 1164680 A2 | 12/2001 |
| FR | 2730358 A1 | 8/1996 |
| JP | 2013125701 A | 6/2013 |
| WO | 2017140354 A1 | 8/2017 |
| WO | 2017140355 A1 | 8/2017 |

OTHER PUBLICATIONS

The First Official Action and search report dated Jul. 2, 2019 for Chinese application No. 201710040478.0, 10 pages.
Notice of Allowance and supplemental search report dated Apr. 22, 2020 for Chinese application No. 201710040478.0, 6 pages.
The Second Office Action for CN Application No. 201710040478.0, dated Dec. 24, 2019, 4 pages.
The First Office Action for U.S. Appl. No. 15/869,318, dated Dec. 6, 2019, 16 pages.
The Final Office Action for U.S. Appl. No. 15/869,318, dated Jun. 19, 2020,16 pages.
Notice of Allowance and supplemental search report for U.S. Appl. No. 15/869,318, dated Oct. 27, 2020, 11 pages.

\* cited by examiner

*Primary Examiner* — Arun C Williams
(74) *Attorney, Agent, or Firm* — East IP P.C.

(57) ABSTRACT

A method, an apparatus and a system for controlling charging of a battery module are provided in the present disclosure. The method for controlling charging of the battery module may include: acquiring an internal pressure value of the battery module; determining a target pressure threshold range to which the acquired internal pressure value of the battery module belongs, based on a plurality of predefined pressure threshold ranges; obtaining a target charge cutoff voltage corresponding to the target pressure threshold range, based on a correspondence relationship between a plurality of predefined charge cutoff voltage and the plurality of predefined pressure threshold ranges; and controlling the battery module to be charged based on the obtained target charge cutoff voltage.

12 Claims, 8 Drawing Sheets

METHOD, APPARATUS AND SYSTEM FOR CONTROLLING CHARGING OF A BATTERY MODULE

CROSS-REFERENCE TO RELATED APPLICATION

This application is a divisional application of U.S. patent application Ser. No. 15/869,318 filed on Jan. 12, 2018, which claims priority to Chinese Patent Application No. 201710040478.0, filed on Jan. 19, 2017. The aforementioned patent applications are hereby incorporated by reference in their entireties.

TECHNICAL FIELD

The present disclosure relates to the field of battery technology, and more particularly to a method, an apparatus and a system for controlling charging of a battery module.

BACKGROUND

With the wide utilization of new energy sources, a battery module may be used as a power source in various fields. In order to increase the life of the battery module, the battery module can generally charge and discharge in cycles and thus can be recycled.

Moreover, due to a user's high requirement to usage experience of the battery module, the user may no longer use a charging speed as a single evaluation index to evaluate the battery module. The life for cycle charging and discharging of the battery module may become an evaluation index for evaluating the battery module as well. However, most of existing battery modules have a relatively short life for cycle charging and discharging. Taking a lithium battery as an example, a process for cycle charging and discharging the battery module is a process of repeatedly rapid insertion and extraction of lithium ions. In this process, the anode graphite in the battery module is rapidly expanding due to the rapid insertion of the lithium ions, and the pressure generated by the expansion causes a squeezing effect inside the battery module. When the pressure in the battery module increases to a certain value, the electrolyte and lithium ions in the battery module will be redistributed to make the lithium ions highly concentrated at a certain part of the battery module. This may result in side reactions in the battery module, deteriorate the recycle of the battery module, and consequently reduce the life for cycle charging of the battery module.

SUMMARY

A method, an apparatus and a system for controlling charging of a battery module are provided in embodiments of the present disclosure.

According to an aspect, a method for controlling charging of the battery module is provided in an embodiment of the present disclosure. The method may include: acquiring an internal pressure value of the battery module; determining a target pressure threshold range to which the acquired internal pressure value of the battery module belongs, based on a plurality of predefined pressure threshold ranges; obtaining a target charge cutoff voltage corresponding to the target pressure threshold range, based on a correspondence relationship between a plurality of predefined charge cutoff voltage and the plurality of predefined pressure threshold ranges; and controlling the battery module to be charged based on the obtained target charge cutoff voltage.

According to another aspect, an apparatus for controlling charging of the battery module is provided in an embodiment of the present disclosure. The apparatus may include: a pressure acquisition unit configured to acquire an internal pressure value of the battery module; a pressure threshold range determination unit configured to determine a target pressure threshold range to which the acquired internal pressure value of the battery module belongs, based on a plurality of predefined pressure threshold ranges; a lookup unit configured to obtain a target charge cutoff voltage corresponding to the target pressure threshold range, based on a correspondence relationship between a plurality of predefined charge cutoff voltage and the plurality of predefined pressure threshold ranges; and a charge control unit configured to control the battery module to be charged based on the obtained target charge cutoff voltage.

According to a further aspect, a system for controlling charging of the battery module is provided in an embodiment of the present disclosure. The system may include the above apparatus for controlling charging of the battery module; and at least one pressure sensor provided on each battery cell in the battery module and/or between two adjacent battery cells in the battery module, and configured to sense an internal pressure of the battery module.

BRIEF DESCRIPTION OF THE DRAWINGS

To provide a better understanding of the present disclosure, the detailed description is described in conjunction with the accompanying figures, wherein same or similar reference numerals represent same or similar features, in which.

DETAILED DESCRIPTION

Various aspects of features and exemplary embodiments of the present disclosure will be described in detail in the following. In the detailed description below, numerous specific details are set forth to provide a thorough understanding of the present disclosure. However, it is obvious to those skilled in the art that the present disclosure can be practiced without some of these specific details. The description of embodiments below is merely to provide a better understanding of the present disclosure by illustrating examples of the present disclosure. The present disclosure is not limited to any specific configuration and algorithm as described below, but instead, covers any modification, replacement and improvement to elements, components, and algorithms without departing from the spirit of the present disclosure. In the drawings and the following description, well known structures and technologies are not illustrated, in order to avoid obscuring the present disclosure.

A method, an apparatus and a system for controlling charging of a battery module are provided in embodiments of the present disclosure to enable the control of a charging process of the battery module. Specifically, in the embodiments, a pressure sensor may be provided on a battery cell to sense expansion pressure generated by the battery cell, and with respect to the increasing expansion pressure, different charge cutoff voltages may be selected and applied in the charging process. The battery module in the embodiment of the present disclosure may include at least one battery cell, and may be a lithium battery or other type of battery but not limited thereto.

Figure 1:
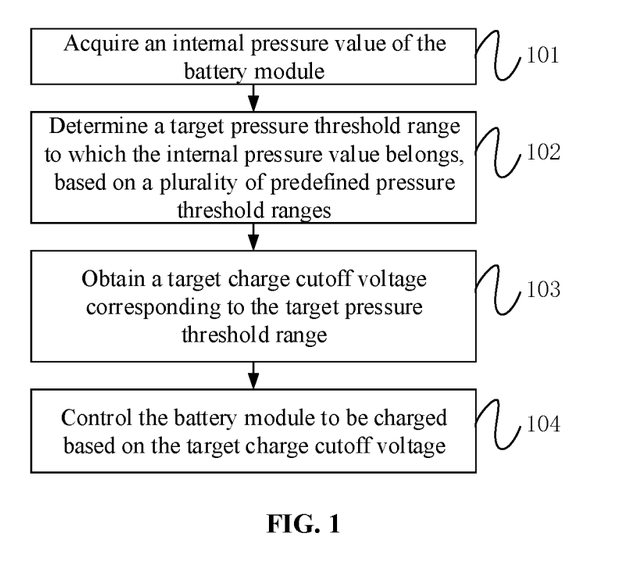
FIG. 1 is a flow chart illustrating a method for controlling charging of a battery module in accordance with an embodiment of the present disclosure.

FIG. 1 is a flow chart illustrating a method for controlling charging of a battery module in accordance with an embodiment of the present disclosure. As shown in FIG. 1, the method may include step 101 to step 104.

At step 101, an internal pressure value of the battery module may be acquired.

In the embodiment, the internal pressure value of the battery module may be acquired by sensing via a pressure sensor provided in the battery module.

At step 102, a target pressure threshold range to which the sensed internal pressure value of the battery module belongs may be determined according to a plurality of predefined pressure threshold ranges.

In the embodiment, a plurality of pressure threshold ranges may be predefined as needed and the size of each pressure threshold range may be defined depending on characteristics of the battery module itself, its work scene and the like. A certain pressure threshold range into which the sensed internal pressure value of the battery module falls may be found by checking the plurality of predefined pressure threshold ranges and determined as the target pressure threshold range.

At step 103, a target charge cutoff voltage corresponding to the target pressure threshold range may be obtained according to a correspondence relationship between a plurality of predefined charge cutoff voltage and the plurality of predefined pressure threshold ranges.

In the embodiment, a respective charge cutoff voltage may be predefined for each distinct pressure threshold range. In an example, a certain charge cutoff voltage corresponding to the target pressure threshold range may be found by looking up a table representing the correspondence relationship between the plurality of predefined charge cutoff voltage and the plurality of predefined pressure threshold ranges, and determined as the target charge cutoff voltage. In another example, the target charge cutoff voltage corresponding to the target pressure threshold range may be calculated by referring to an expression that represents the correspondence relationship between the plurality of predefined charge cutoff voltage and the plurality of predefined pressure threshold ranges.

At step 104, the battery module may be controlled to be charged based on the obtained target charge cutoff voltage.

The embodiment of the present disclosure provides a method for controlling charging of a battery module. In accordance with the correspondence relationship between the plurality of predefined charge cutoff voltage and the plurality of predefined pressure threshold ranges, the target charge cutoff voltage corresponding to the target pressure threshold range to which the sensed internal pressure value of the battery module belongs may be obtained and applied to charge the battery module. In this way, a specific target charge cutoff voltage can be selected with respect to each distinct internal pressure value of the battery module, and applied to control the charging of the battery module. According to the embodiment of the present disclosure, the battery module may not be charged at a fixed charge cutoff voltage any more. Instead, as the internal pressure of the battery module increases, the target charge cutoff voltage for charging the battery module may be adjusted accordingly, so as to avoid deterioration of charging cycles of the battery module and thus lengthen the life for cycle charging of the battery module.

It should be noted that, in an exemplary embodiment, two adjacent pressure threshold ranges selected from the plurality of predefined pressure threshold ranges may be set to be continuous and non-overlapping. Meanwhile, for the two adjacent pressure threshold ranges, a first charge cutoff voltage corresponding to one pressure threshold range containing larger pressure thresholds may be smaller than a second charge cutoff voltage corresponding to the other pressure threshold range containing smaller pressure thresholds. For example, three pressure threshold ranges are predefined as $[F_{O1}, F_{O2})$, $[F_{O2}, F_{O3})$ and $[F_{O3}, F_{O4})$ respectively, wherein $F_{O1} < F_{O2} < F_{O3} < F_{O4}$ and $[F_{O1}, F_{O2})$ represents $F_{O1} \leq F < F_{O2}$, $[F_{O1}, F_{O2})$ corresponds to a charge cutoff voltage of $C_1$; $[F_{O2}, F_{O3})$ corresponds to a charge cutoff voltage of $C_2$; and $[F_{O3}, F_{O4})$ corresponds to a charge cutoff voltage of $C_3$, wherein $C_1 > C_2 > C_3$. When the internal pressure value F of the battery module is within the range of $[F_{O1}, F_{O2})$, the battery module may be controlled to be charged at the charge cutoff voltage $C_1$. When the internal pressure value F of the battery module increases as the number of charging cycles increases until the internal pressure value F of the battery module increases to be within the range of $[F_{O1}, F_{O2})$, the charge cutoff voltage of the battery module may be switched to $C_2$, and so on. The increasing rate of the pressure inside the battery module may be slowed down by reducing an upper limit voltage (i.e. the charge cutoff voltage) for charging the battery module, so that the life for cycle charging of the battery module may be lengthened.

Figure 2:
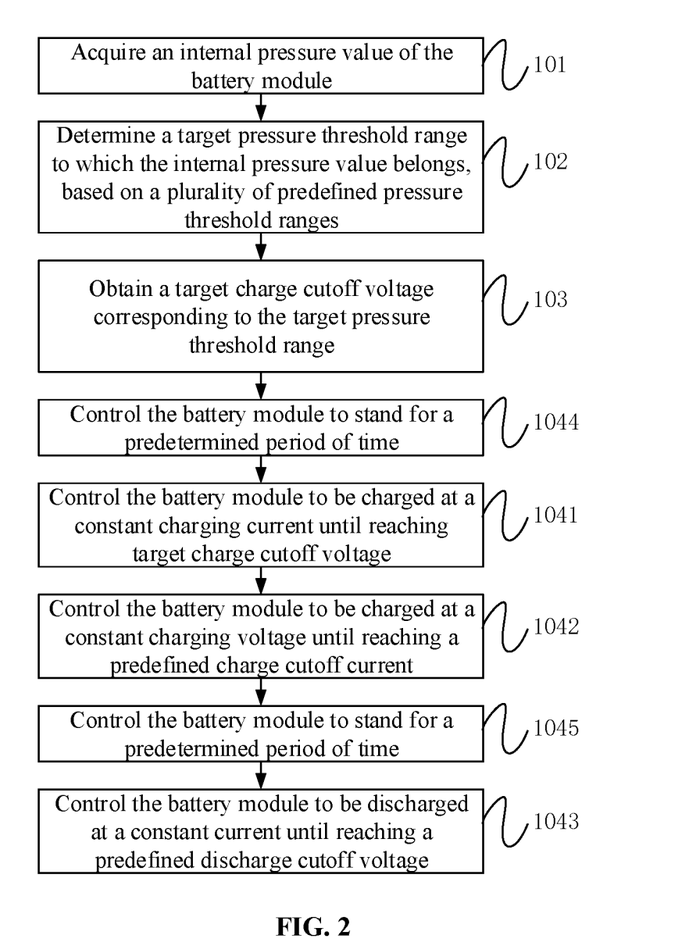
FIG. 2 is a flow chart illustrating a method for controlling charging of a battery module in accordance with another embodiment of the present disclosure.

FIG. 2 is a flow chart illustrating a method for controlling charging of a battery module in accordance with another embodiment of the present disclosure. As shown in FIG. 2, the difference between FIG. 2 and FIG. 1 is that the step 104 in the method for controlling charging of a battery module in FIG. 1 may be implemented by exemplary steps 1041 and 1042. Furthermore, in an exemplary embodiment, a step 1043 may follow the step 1042; in another exemplary embodiment, a step 1044 may be carried out prior to the step 1041; and in a further exemplary embodiment, a step 1045 may be carried out prior to the step 1043. The various steps in the exemplary embodiment of FIG. 2 will be described in detail below.

At step 1044, the battery module may be controlled to rest for a predetermined period of time.

In the embodiment, before controlling the battery module to be charged, the battery module may be controlled to rest for a period of time to ensure the stability of subsequent charging of the battery module.

At step 1041, the battery module may be controlled to be charged in a constant current charging process until the voltage of the battery module reaches a target charge cutoff voltage.

In an example, the battery module is controlled to be charged at a constant current of 4C, until the voltage of the battery module reaches the target charge cutoff voltage, for example 49.2V. Here, the constant current charging process may be a fast charging process.

At step 1042, the battery module may be controlled to be charged in a constant voltage charging process using the target charge cutoff voltage, until the current of the battery module reaches a predefined charge cutoff current.

It should be noted that there may be no corresponding relationship between the charge cutoff current and the pressure threshold ranges. The charge cutoff current may be a charging current that the battery module needs to reach when the battery module performs the constant voltage charging process following the constant current charging process. For example, the battery module may be controlled to perform the constant current charging process until the voltage of the battery module reaches 49.2 V at the above step 1401, and then the battery module may be controlled to perform the constant voltage charging process until the current of the battery module reaches the charge cutoff current of 0.05C.

At step 1045, the battery module may be controlled to rest for a predetermined period of time.

After the battery module completes the charging process, the battery module may be controlled to discharge when it is being used. The battery module may generate heat during the charging process. The heat may affect the voltage and the current of the battery module. Thus, it may be necessary to control the battery module to rest for a predetermined period of time before the discharge, thereby improving the stability of the use of the battery module. The predetermined periods of time in step 1044 and step 1045 may be specifically set according to the characteristics of the battery module itself and the work scene but not limited thereto. For example, the battery module may be controlled to rest for 10 minutes.

At step 1043, the battery module may be controlled to be discharged in a constant current discharging process until the voltage of the battery module reaches a predefined discharge cutoff voltage.

When using the battery module as a power supply, the battery module may be controlled to perform the constant current discharging process. Once the voltage of the battery module reaches the predefined discharge cutoff voltage, the discharging process ends and the charging process of the battery module starts again. For example, the battery module may be controlled to be discharged at a constant current of 1C, and once the voltage of the battery module reaches 33.6V, the discharging process may stop. Then the charging process of the battery module may start again after the battery module is controlled to rest for 10 minutes. In the embodiment, there may be no corresponding relationship between the discharge cutoff voltage and the pressure threshold ranges. The discharge cutoff voltage may be a cutoff voltage that the battery module needs to reach after the battery module performs the constant current discharging process.

It should be noted that, in the above embodiment, the internal pressure value of the battery module can be sensed in real time. When it is sensed that the internal pressure value of the battery module jumps from one pressure threshold range to another pressure threshold range, the current charging process may be accordingly switched to a charging process that corresponds to the another pressure threshold range. For example, four pressure threshold ranges are predefined as [0, 300 kgf), [300 kgf, 1000 kgf), [1000 kgf, 1500 kgf) and [1500 kgf, +∞) respectively, wherein kgf represents kilogram force. For each pressure threshold range, there is a corresponding charge cutoff voltage, i.e. the four pressure threshold ranges correspond to the charge cutoff voltages 49.2V, 48.6V, 48V and 47.4V respectively. In other words, for the above four pressure threshold ranges, there are four different charging/discharging processes A0 to A3, respectively.

Charging/discharging process A0: (1) control the battery module to rest for 10 minutes; (2) control the battery module to be charged at a constant current of 4C until the voltage of the battery module reaches a charge cutoff voltage of 49.2V, and then be charged at the constant voltage of 49.2V until the current of the battery module reaches a charge cutoff current of 0.05C; (3) control the battery module to rest for 10 minutes; (4) control the battery module to be discharged at a constant current of 1C until the voltage of the battery module reaches a discharge cutoff voltage of 33.6V.

Charging/discharging process A1: (1) control the battery module to rest for 10 minutes; (2) control the battery module to be charged at a constant current of 4C until the voltage of the battery module reaches a charge cutoff voltage of 48.6V, and then be charged at the constant voltage of 48.6V until the current of the battery module reaches a charge cutoff current of 0.05C; (3) control the battery module to rest for 10 minutes; (4) control the battery module to be discharged at a constant current of 1C until the voltage of the battery module reaches a discharge cutoff voltage of 33.6V.

Charging/discharging process A2: (1) control the battery module to rest for 10 minutes; (2) control the battery module to be charged at a constant current of 4C until the voltage of the battery module reaches a charge cutoff voltage of 48V, and then be charged at the constant voltage of 48V until the current of the battery module reaches a charge cutoff current of 0.05C; (3) control the battery module to rest for 10 minutes; (4) control the battery module to be discharged at a constant current of 1C until the voltage of the battery module reaches a discharge cutoff voltage of 33.6V.

Charging/discharging process A3: (1) control the battery module to rest for 10 minutes; (2) control the battery module to be charged at a constant current of 4C until the voltage of the battery module reaches a charge cutoff voltage of 47.4V, and then be charged at the constant voltage of 47.4 V until the current of the battery module reaches a charge cutoff current of 0.05C; (3) control the battery module to rest for 10 minutes; (4) control the battery module to be discharged at a constant current of 1C until the voltage of the battery module reaches a discharge cutoff voltage of 33.6V.

When the battery module is initially used, it may be sensed that the internal pressure value of the battery module is within the range of [0,300 kgf]. Thus the battery module may be controlled to be charged and discharged by the charging/discharging process A0. The sensed internal pressure value of the battery module may increases as the number of charging and discharging cycles of the battery module increases. When it is sensed that the internal pressure value of the battery module increases to be within the range of [300 kgf, 1000 kgf), the battery module may be controlled to switch from using the charging/discharging process A0 to using the charging/discharging A1, and so on.

Figure 3:
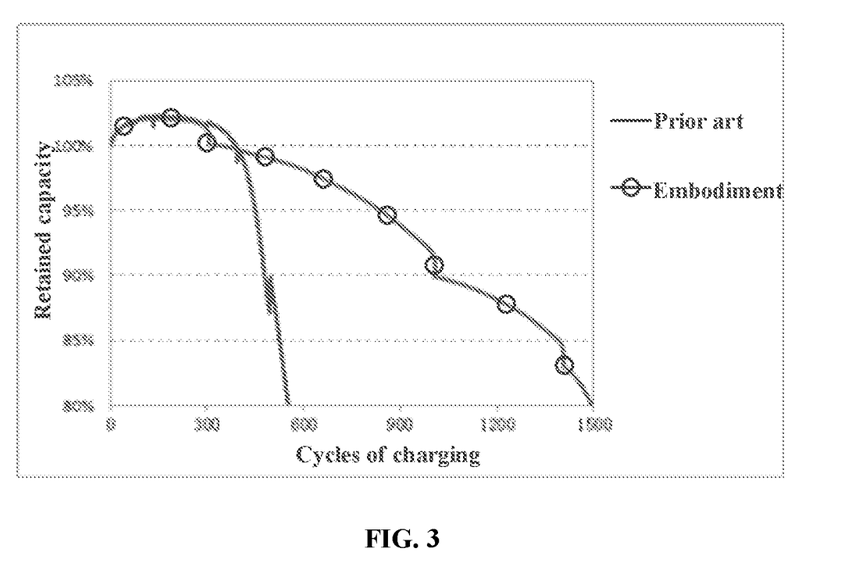
FIG. 3 is a schematic diagram showing a comparison of a life of a battery module employing a method for controlling charging of the battery module in accordance with an embodiment of the present disclosure versus a life of a battery module employing an existing method for controlling charging of the battery module.

FIG. 3 is a schematic diagram showing a comparison of a life of a battery module employing a method for controlling charging of the battery module in accordance with an embodiment of the present disclosure versus a life of a battery module employing an existing method for controlling charging of the battery module. As shown in FIG. 3, the battery module employing the method for controlling charging of the battery module in accordance with the embodiment of the present disclosure may have up to 1500 cycles of charging and discharging. The number of 1500 cycles of charging and discharging is much larger than the number of 550 cycles of charging and discharging. The cycle life of the battery module has been significantly lengthened by 173%.

Figure 4:
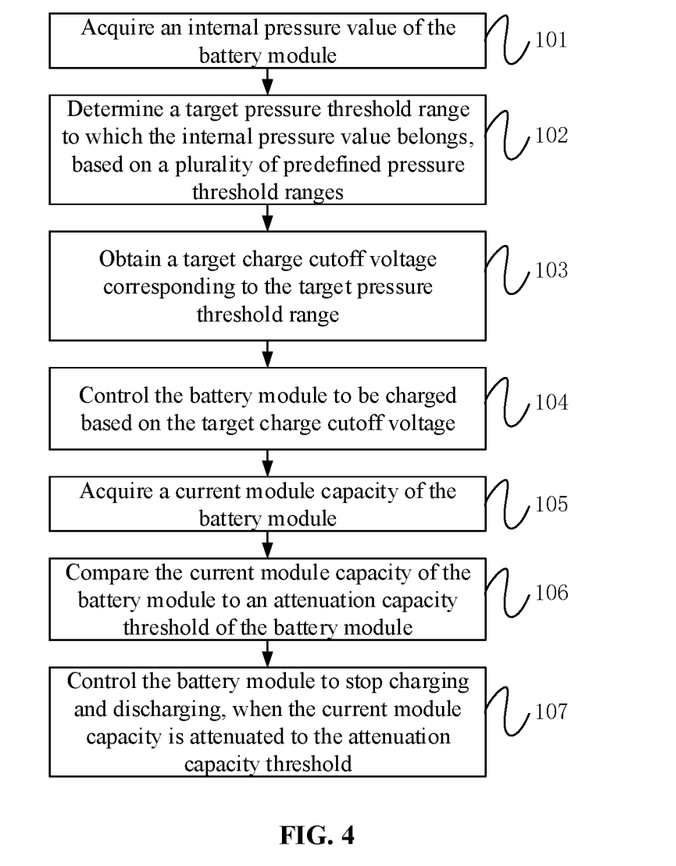
FIG. 4 is a flow chart illustrating a method for controlling charging of a battery module in accordance with a further embodiment of the present disclosure.

FIG. 4 is a flow chart illustrating a method for controlling charging of a battery module in accordance with a further embodiment of the present disclosure. As shown in FIG. 4, the difference between FIG. 4 and FIG. 1 is that the method for controlling charging of the battery module may further include step 105 to step 107.

At step 105, a current module capacity of the battery module may be acquired.

At step 106, the current module capacity of the battery module may be compared to an attenuation capacity threshold of the battery module.

With multiple cycles of charging and discharging the battery module, the module capacity of the battery module may gradually attenuate. When the current module capacity of the battery module is equal to the attenuation capacity threshold of the battery module, that is, when the current module capacity of the battery module is attenuated to the attenuation capacity threshold, it may be indicated that the battery module is aging and the battery module may be controlled to stop the charging and discharging. Further, an alert message may be sent out to remind the user to replace the battery module with a new one.

At step 107, when the current module capacity of the battery module is attenuated to the attenuation capacity threshold of the battery module, the battery module may be controlled to stop the charging and discharging.

For example, when the current module capacity of the battery module is attenuated to 80% of an initial capacity of the battery module, the battery module may be controlled to stop the charging and discharging. When the current module capacity of the battery module is attenuated to the attenuation capacity threshold of the battery module, the charging and discharging efficiency of the battery module may have been very low. The use of the battery module may be stopped, and potential risks due to overuse of the battery module may also be avoid.

In an exemplary embodiment, the steps involved in the above embodiments may be carried out by a battery management system (BMS).

Figure 5:
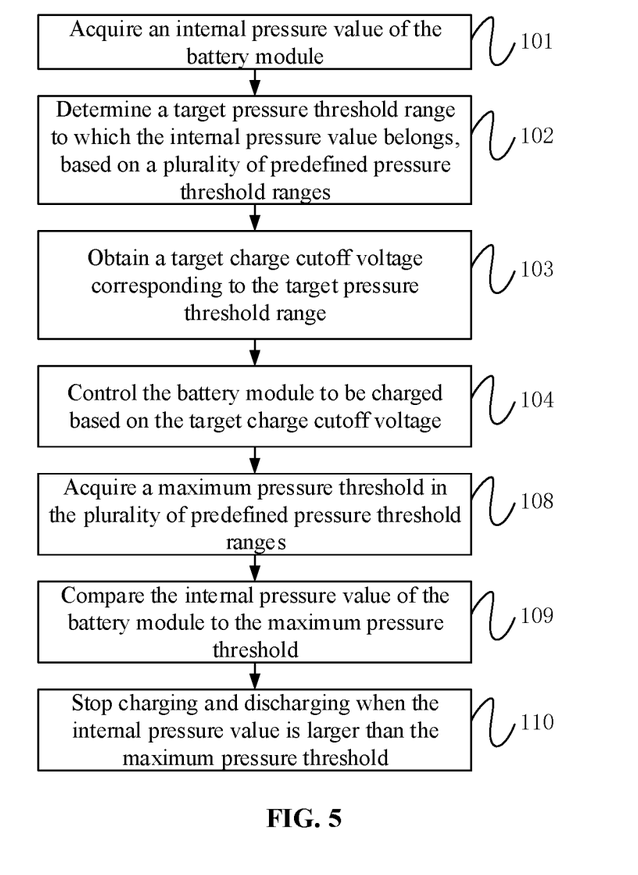
FIG. 5 is a flow chart illustrating a method for controlling charging of a battery module in accordance with another further embodiment of the present disclosure.

FIG. 5 is a flow chart illustrating a method to control charging of a battery module in accordance with another further embodiment of the present disclosure. As shown in FIG. 5, the difference between FIG. 5 and FIG. 1 is that the method for controlling charging of the battery module may further include step 108 to step 110.

At step 108, a maximum pressure threshold in the plurality of predefined pressure threshold ranges may be acquired.

For example, three pressure threshold ranges are predefined as [0, 300 kgf), [300 kgf, 1000 kgf) and [1000 kgf, 1500 kgf) respectively, wherein a maximum pressure threshold in the plurality of predefined pressure threshold ranges is 1500 kgf.

At step 109, the internal pressure value of the battery module may be compared to the maximum pressure threshold.

At step 110, when the internal pressure value of the battery module is larger than the maximum pressure threshold, the battery module may be controlled to stop charging and discharging.

When the internal pressure value of the battery module is greater than the maximum pressure threshold, it may be indicated that the internal pressure of the battery module is too large to continue to use. On the one hand, the charging and discharging efficiency of the battery module has been very low, thereby significantly reducing the speed of charging and discharging. On the other hand, the battery module may explode due to too large internal pressure, resulting in security problems. Therefore, when the internal pressure value of the battery module is greater than the maximum pressure threshold, the battery module may be controlled to stop charging and discharging. The user should stop using the battery module and replace the battery module with a new one. For example, in the example given for step 108, when the internal pressure value of the battery module is greater than the maximum pressure threshold of 1500 kgf, the battery module may be controlled to stop charging and discharging.

Figure 6:
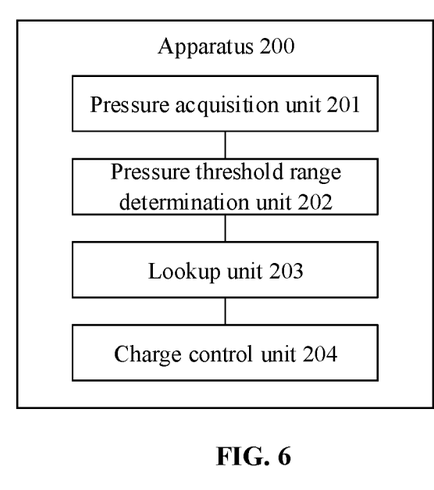
FIG. 6 is a schematic structure diagram of an apparatus for controlling charging of a battery module in accordance with an embodiment of the present disclosure.

FIG. 6 is a schematic structure diagram of an apparatus for controlling charging of a battery module in accordance with an embodiment of the present disclosure. As shown in FIG. 6, the apparatus 200 for controlling charging of the battery module may include a pressure acquisition unit 201, a pressure threshold range determination unit 202, a lookup unit 203 and a charge control unit 204.

In the embodiment, the pressure acquisition unit 201 may be configured to acquire an internal pressure value of the battery module.

The pressure threshold range determination unit 202 may be configured to determine a target pressure threshold range to which the acquired internal pressure value of the battery module belongs, according to a plurality of predefined pressure threshold ranges.

The lookup unit 203 may be configured to obtain a target charge cutoff voltage corresponding to the target pressure threshold range, according to a correspondence relationship between a plurality of predefined charge cutoff voltage and the plurality of predefined pressure threshold ranges.

The charge control unit 204 may be configured to control the battery module to be charged based on the obtained target charge cutoff voltage.

The embodiment of the present disclosure provides an apparatus 200 for controlling charging of a battery module. In accordance with the correspondence relationship between the plurality of predefined charge cutoff voltage and the plurality of predefined pressure threshold ranges, the target charge cutoff voltage corresponding to the target pressure threshold range to which the sensed internal pressure value of the battery module belongs may be obtained and applied to charge the battery module. In this way, a specific target charge cutoff voltage can be selected with respect to each real internal pressure value of the battery module as acquired, and applied to control the charging of the battery module. According the embodiment of the present disclosure, the battery module may not be charged at a fixed charge cutoff voltage any more. Instead, as the internal pressure of the battery module increases, the target charge cutoff voltage for charging the battery module may be adjusted accordingly, so as to avoid deterioration of charging cycles of the battery module and thus lengthen the life for cycle charging of the battery module.

It should be noted that, in an exemplary embodiment, two adjacent pressure threshold ranges selected from the plurality of predefined pressure threshold ranges may be set to be continuous and non-overlapping. Meanwhile, for the two adjacent pressure threshold ranges, a first charge cutoff voltage corresponding to one pressure threshold range containing larger pressure thresholds may be smaller than a second charge cutoff voltage corresponding to the other pressure threshold range containing smaller pressure thresholds.

Figure 7:
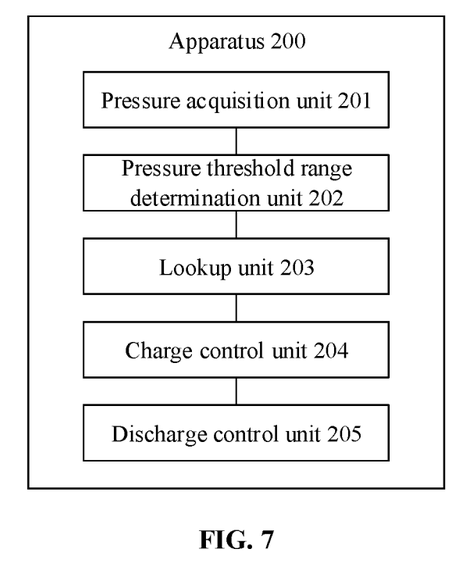
FIG. 7 is a schematic structure diagram of an apparatus for controlling charging of a battery module in accordance with another embodiment of the present disclosure.

FIG. 7 is a schematic structure diagram of an apparatus for controlling charging of a battery module in accordance with another embodiment of the present disclosure. The difference between FIG. 7 and FIG. 6 is that the apparatus 200 for controlling charging of the battery module may further include a discharge control unit 205.

The discharge control unit 205 may be configured to control the battery module to be discharged at a constant current until the voltage of the battery module reaches a predefined discharge cutoff voltage.

In another exemplary embodiment, the charge control unit 204 in the above embodiment may be further configured to control the battery module to perform a constant current charging process until the voltage of the battery module reaches the target charge cutoff voltage; and then control the battery module to perform a constant voltage charging process until the current of the battery module reaches a predefined charge cutoff current.

In a further exemplary embodiment, the charge control unit 204 in the above embodiment may be further configured to control the battery module to rest for a predetermined period of time before controlling the battery module to perform a constant current charging process until the voltage of the battery module reaches the target charge cutoff voltage.

In another further exemplary embodiment, the charge control unit 204 in the above embodiment may be further configured to control the battery module to rest for a predetermined period of time before controlling the battery module to perform a constant current discharging process until the voltage of the battery module reaches a predefined discharge cutoff voltage.

Figure 8:
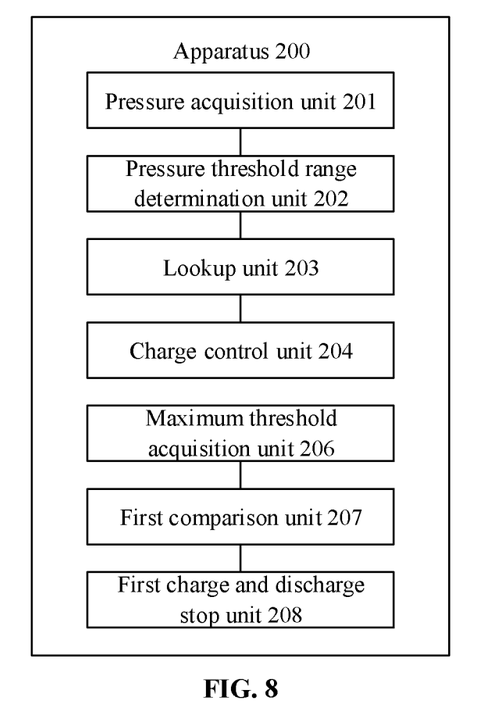
FIG. 8 is a schematic structure diagram of an apparatus for controlling charging of a battery module in accordance with a further embodiment of the present disclosure.

FIG. 8 is a schematic structure diagram of an apparatus for controlling charging of a battery module in accordance with a further embodiment of the present disclosure. The difference between FIG. 8 and FIG. 6 is that the apparatus 200 for controlling charging of the battery module may further include a maximum threshold acquisition unit 206, a first comparison unit 207 and a first charge and discharge stop unit 208.

The maximum threshold acquisition unit 206 may be configured to acquire a maximum pressure threshold in the plurality of predefined pressure threshold ranges.

The first comparison unit 207 may be configured to compare the internal pressure value of the battery module to the maximum pressure threshold.

The first charge and discharge stop unit 208 may be configured to control the battery module to stop charging and discharging, when the internal pressure value of the battery module is larger than the maximum pressure threshold.

Figure 9:
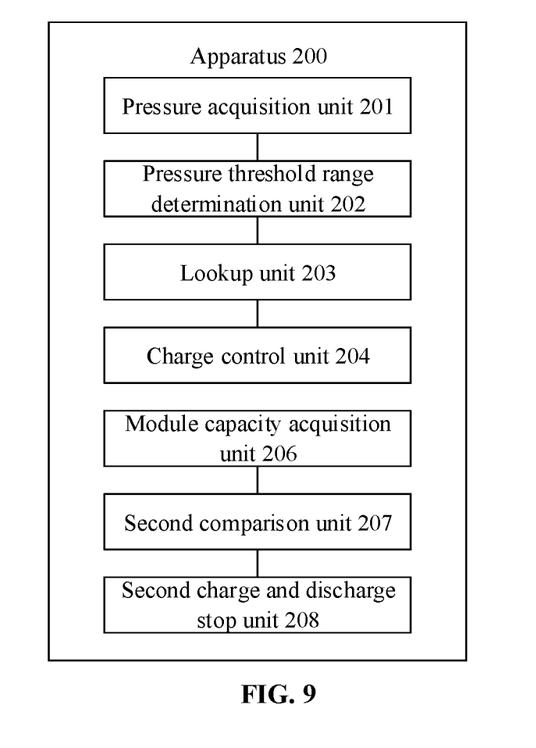
FIG. 9 is a schematic structure diagram of an apparatus for controlling charging and discharging of a battery module in accordance with another further embodiment of the present disclosure.

FIG. 9 is a schematic structure diagram of an apparatus for controlling charging and discharging of a battery module in accordance with another further embodiment of the present disclosure. The difference between FIG. 9 and FIG. 6 is that the apparatus 200 for controlling charging and discharging of the battery module may further include a module capacity acquisition unit 209, a second comparison unit 210 and a second charge and discharge stop unit 211.

The module capacity acquisition unit 209 may be configured to acquire a current module capacity of the battery module.

The second comparison unit 210 may be configured to compare the current module capacity of the battery module to an attenuation capacity threshold of the battery module.

The second charge and discharge stop unit 211 may be configured to control the battery module to stop charging and discharging, when the current module capacity of the battery module is attenuated to the attenuation capacity threshold of the battery module.

In an embodiment of the present invention, there is also provided a system for controlling charging and discharging of a battery module. The system may include the apparatus for controlling charging and discharging of the battery module in the above embodiment, and at least one pressure sensor on battery cells in the battery module and/or between two adjacent battery cells. The at least one pressure sensor may be configured to sense the internal pressure of the battery module.

Figure 10:
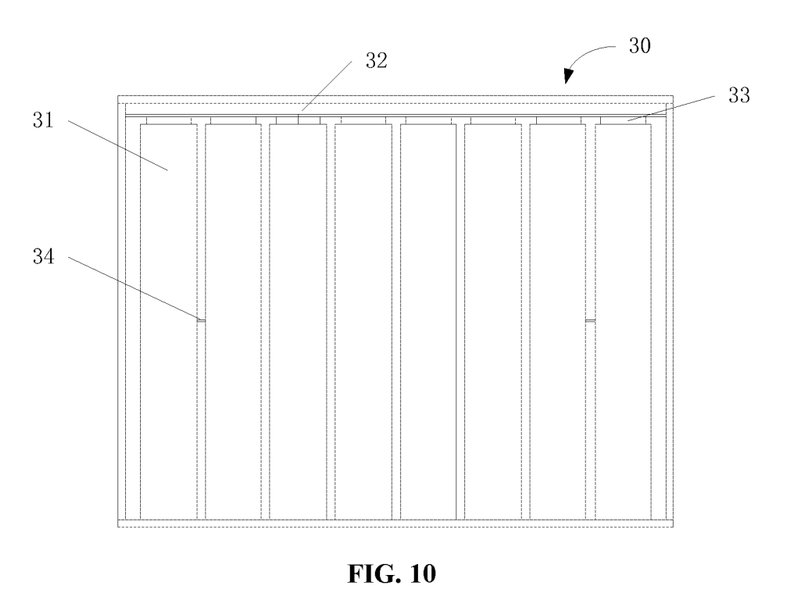
FIG. 10 is a schematic structure diagram of a battery module configured with a pressure sensor in accordance with an embodiment of the present disclosure.

FIG. 10 is a schematic structure diagram of a battery module 30 configured with a pressure sensor in accordance with an embodiment of the present disclosure. As shown in FIG. 10, battery cells 31 may be uniformly distributed in the battery module 30; a PCB circuit board 32 may be connected to terminals 33 of the battery cells 31 by means of soldering; a pressure sensor 34 may be able to sense an internal pressure of the battery module and also convert the sensed pressure signal into an electrical signal for transmission to the PCB circuit board 32, so as to easily be transmitted to outside or processed. It is to be noted that when the battery module 30 may include a plurality of battery cells 31, at least one pressure sensor 34 may be provided between two adjacent battery cells 31 to facilitate accurate sensing of the pressure between battery cells (i.e. the internal pressure value of the battery module).

In summary, with the system for controlling charging and discharging of the battery module according to the embodiment of the present invention, deterioration of charging cycles of the battery module can be avoided and the life for cycle charging of the battery module can be lengthened.

The functional modules shown in the structural block diagram described above may be implemented as hardware, software, firmware, or a combination thereof. When implemented as hardware, it may be, for example, electronic circuits, application specific integrated circuits (ASICs), suitable firmware, plug-ins, function cards, and so forth. When implemented as software, the element of the present disclosure is a program or a code segment used to perform the required task. The program or code segment may be stored in a machine-readable medium or transmitted over a transmission medium or a communication link through a data signal carried in a carrier wave.

It should be clearly noted that the various embodiments in the specification are all described in a progressive manner. The same or similar parts of the embodiments may be referred to each other, and the difference of an embodiment from another embodiment has been illustrated in detail. The features, structures, or characteristics described in the embodiments described above may be combined in one or more embodiments in any suitable manner. The foregoing descriptions are merely preferred embodiments of the present application and are not intended to limit the present application, and various changes and modifications may be made by those skilled in the art. Any modifications, equivalent substitutions, improvements, and the like within the spirit and principles of the application are intended to be included within the claimed scope of the present application. Therefore, the protection scope of the present application is only limited by the following claims.

What is claimed is:

1. A method for controlling charging of a battery module, comprising:
    acquiring an internal pressure value of the battery module during charging;
    when determining the internal pressure value of the battery module increases from a first pressure threshold range to a second pressure threshold range, obtaining a second target charge cutoff voltage corresponding to the second target pressure threshold range;
    controlling the battery module to be charged at a constant charging current until a voltage of the battery module reaches the second target charge cutoff voltage; and
    controlling the battery module to be charged at the second target charge cutoff voltage until a current of the battery module reaches a predefined charge cutoff current,
    wherein the first pressure threshold range and the second pressure threshold range are two adjacent pressure threshold ranges and are continuous and non-overlapping; and a first target charge cutoff voltage corresponding to the first pressure threshold range is larger than the second target charge cutoff voltage corresponding to the second pressure threshold range.

2. The method of claim 1, wherein before controlling the battery module to be charged at a constant charging current until a voltage of the battery module reaches the second target charge cutoff voltage, the method further comprises:
    controlling the battery module to rest for a first predetermined period of time.

3. The method of claim 1, wherein the method further comprises:
    controlling the battery module to be discharged at a constant discharging current until a voltage of the battery module reaches a predefined discharge cutoff voltage.

4. The method of claim 3, wherein before controlling the battery module to be discharged at a constant discharging current until a voltage of the battery module reaches a predefined discharge cutoff voltage, the method further comprises:
    controlling the battery module to rest for a second predetermined period of time.

5. The method of claim 1, further comprising:
    controlling the battery module to stop charging and discharging, when the internal pressure value of the battery module is larger than a maximum pressure threshold;
    wherein the maximum pressure threshold is a maximum pressure value in a plurality of predefined pressure threshold ranges, wherein the plurality of predefined pressure threshold ranges at least comprises the first pressure threshold range and the second pressure threshold range.

6. The method of claim 1, wherein the acquiring an internal pressure value of the battery module during charging comprises:
    acquiring the internal pressure value of the battery module through sensing by at least one pressure sensor provided on each battery cell in the battery module and/or between two adjacent battery cells in the battery module.

7. A battery management system (BMS), wherein the BMS comprises a memory, a processor and a plurality of instructions stored in the memory that, when executed by the processor, cause the BMS to:
    acquire an internal pressure value of the battery module during charging;
    when determining the internal pressure value of the battery module increases from a first pressure threshold range to a second pressure threshold range, obtain a second target charge cutoff voltage corresponding to the second target pressure threshold range;
    control the battery module to be charged at a constant charging current until a voltage of the battery module reaches the second target charge cutoff voltage; and
    control the battery module to be charged at the second target charge cutoff voltage until a current of the battery module reaches a predefined charge cutoff current,
    wherein the first pressure threshold range and the second pressure threshold range are two adjacent pressure threshold ranges and are continuous and non-overlapping; and a first target charge cutoff voltage corresponding to the first pressure threshold range is larger than the second target charge cutoff voltage corresponding to the second pressure threshold range.

8. The BMS of claim 7, wherein the BMS is further configured to:
    control the battery module to rest for a first predetermined period of time before controlling the battery module to be charged at a constant charging current until a voltage of the battery module reaches the second target charge cutoff voltage.

9. The BMS of claim 7, wherein the BMS is further configured to:
    control the battery module to be discharged at a constant discharging current until a voltage of the battery module reaches a predefined discharge cutoff voltage.

10. The BMS of claim 9, wherein the BMS is further configured to:
    control the battery module to rest for a second predetermined period of time before controlling the battery module to be discharged at a constant discharging current until a voltage of the battery module reaches a predefined discharge cutoff voltage.

11. The BMS of claim 7, wherein the BMS is further configured to:
    control the battery module to stop charging and discharging, when the internal pressure value of the battery module is larger than a maximum pressure threshold;
    wherein the maximum pressure threshold is a maximum pressure value in a plurality of predefined pressure threshold ranges, wherein the plurality of predefined pressure threshold ranges at least comprises the first pressure threshold range and the second pressure threshold range.

12. The BMS of claim 7, wherein the BMS is configured to:
    acquire the internal pressure value of the battery module through sensing by at least one pressure sensor provided on each battery cell in the battery module and/or between two adjacent battery cells in the battery module.

* * * * *